United States Patent [19]

St. Clair

[11] 3,981,151

[45] Sept. 21, 1976

[54] USE OF SOLAR ENERGY HEAT GATHERING AND STORING SYSTEMS TO INCREASE FARM CROP YIELDS

[76] Inventor: John C. St. Clair, Box 216, R.R. 5, London, Ohio 43140

[22] Filed: Jan. 20, 1975

[21] Appl. No.: 542,384

[52] U.S. Cl. .................................... 60/641; 47/17; 47/DIG. 6; 60/659; 126/270; 126/271.1; 126/400
[51] Int. Cl.² .......................................... F24J 3/02
[58] Field of Search ............. 60/641; 126/270, 271, 126/271.1, 400; 47/17, DIG. 6

[56] References Cited
UNITED STATES PATENTS

| 965,391 | 7/1910 | Little | 126/270 |
|---|---|---|---|
| 3,171,403 | 3/1965 | Drescher | 126/270 |
| 3,412,728 | 11/1968 | Thomason | 126/270 |

OTHER PUBLICATIONS

Growing Plants Under Artificial Light, Consumer Reports, Jan. 1955, pp. 37–39.

Primary Examiner—William E. Wayner
Assistant Examiner—Ronald C. Capossela

[57] ABSTRACT

In a solar heat collecting and storage system in which mirrors reflect sunlight on a heat storing material such as a pile of pebbles, with air being drawn into the pile of pebbles so the heat accumulating on the surface of the pile is drawn into the center of the pile of pebbles, is located an artificial light of the correct color so that it will produce crop growth. When the sun is not shining the mirrors, that have been used to collect solar heat, are used to reflect this artificial light over growing crops and thus produce crop yields greater than normal.

4 Claims, 1 Drawing Figure

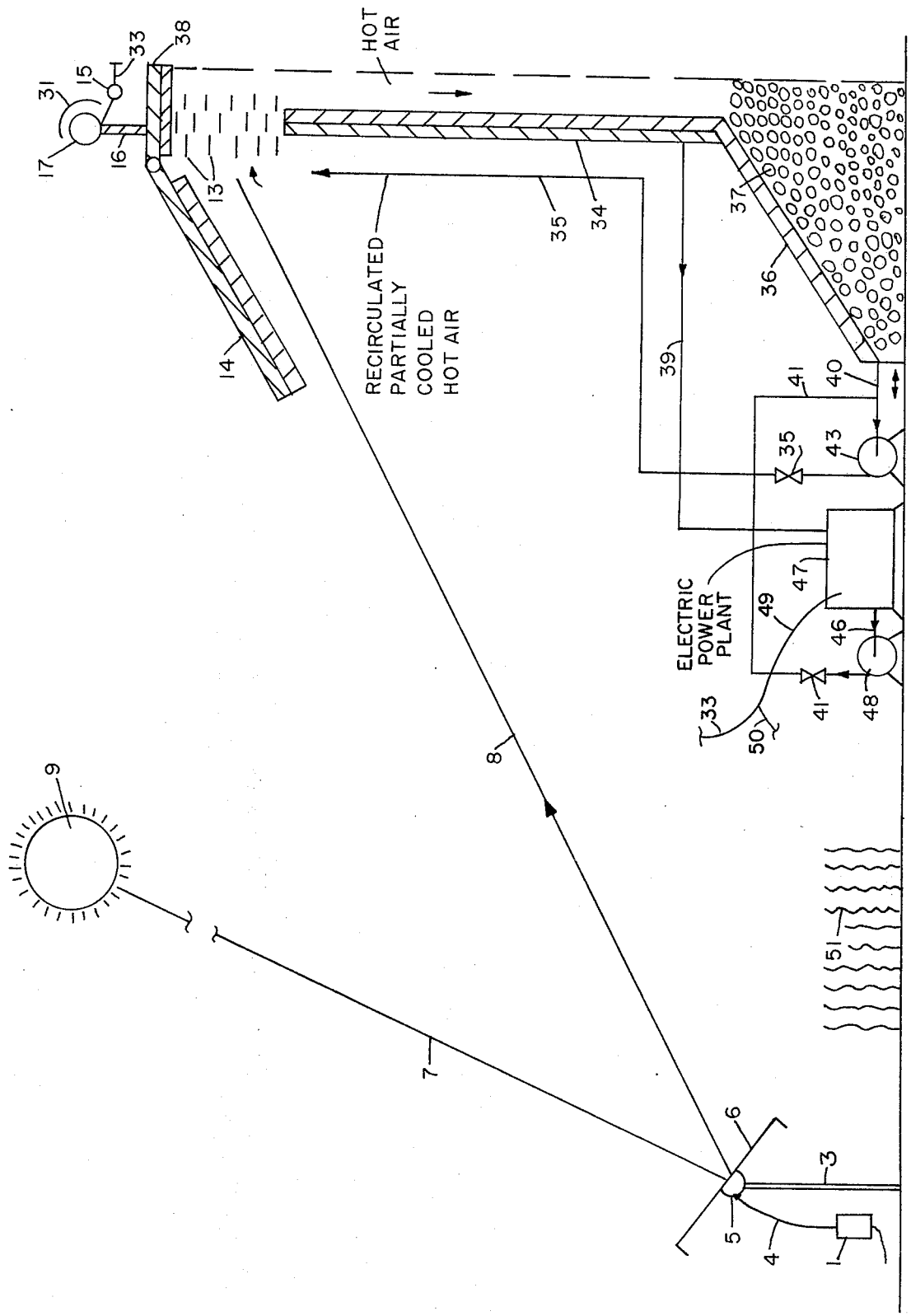

USE OF SOLAR ENERGY HEAT GATHERING AND STORING SYSTEMS TO INCREASE FARM CROP YIELDS

In the St. Clair Solar Energy System, in which mirrors reflect sunlight onto piles of pebbles, one of the serious problems, that is obvious to any one who has lived outside cities, is that the farmers own the land where the mirrors must be mounted and farmers will be very difficult to obtain permission from as to mounting the required mirrors on their land.

For years there has been interest in the possibilities of increasing crop yields by the use of artificial light at night. It has been found that actually only 0.1% to 1% of sunlight normally shining on a plant is used by the plant and this is in very short wave bands or colors of the light. If these short wave bands are separated out from the rest of the light we have light of some specific color for a specific plant. Methods of producing such colored lights for various plants have been more or less successfully produced by electric light bulbs produced by companies as for example the Sylvania Lighting Company.

Experiments have been run using artificial lights on crops at night and electric power companies interested in using facilities for generating and transmitting electricity after midnight, when they are not normally used, have been active in such work. For instance Harold Merkle of the Dayton Power and Light Co., Dayton, Ohio in cooperation with the DeKalb Seed Corn Co. and Sylvania Lighting Company reported work done in Paper 71-833 of the American Society of Agricultural Engineers, Box 229 St. Joseph, Mich. They used 1000 watt bulbs on 25 feet high poles, 160 feet apart. They got crop yields of corn and soybeans of 10% to 25% more than without lights.

The above experiments have the objections that the many electric light poles and the wires to them are expensive. However with such a system as I have disclosed, with one big light in the center acting to send out light to a big bunch of mirrors that distribute the light, the addition of the artificial light for crop purposes requires a very low installation cost. Also as the size of an artificial source of light increases the cost of producing a given total amount of light by a single light source always decreases over the cost of using small multiple units. This applies not only to the first cost of the light source but also to the total amount of electricity required.

The electricity needed for producing light to grow crops can be made from heat of the sun that has to be stored short periods, since just the use during the night of Solar Heat collected during the same day would greatly increase the amount of effective light, for a plant, a plant obtains. So actually the crudest and cheapest Solar Heat storage system, like just water, is profitable in many cases.

However in all cases corn, made by the help of sunlight during periods of excess sunlight, can be stored for future use with the advantage that the St. Clair Solar Energy System can spread out excesses of sunlight over periods of a year or more.

So as a result of the described invention a practical method is disclosed in which the heat of the sun can be stored for years in the form of corn and other farm crops.

And in about all cases, the collection of sun light and its conversion into electricity which is used to generate artificial light for the growth of farm crops is a much more efficient use of sunlight than allowing the sun light to shine on the farm crop. When you consider that a growing plant only uses 0.1% to 1% of the sunlight shining on it the economics of any low cost equipment for accomplishing the above is very favorable for solving the food shortage the world is facing.

The amount of increase of crop yields that are possibly accomplished by reflecting enough light of the proper colors on plants undoubtedly is large. Johnny Pendleton of the University of Illinois reflected the sunlight, normally hitting the ground but missing the stalks of corn in a row, onto the stalks of corn and doubled the yield of corn to 377 bushels per acre. When you realize that my disclosed method of reflecting light on crops would normally be used 13 hours per day, besides the normal sunlight of 8 hours per day the plants got, and my light can easily be more intense in the proper colors, the potentialities of increasing crop yields are staggering.

The drawing shows one form of the invention.

Referring to the drawing we see at 6 a mirror made by stretching a sheet of plastic film over a hoop like a drum head. The plastic film is metallized to form a low cost long lasting efficient mirror. Under government RANN research programs at the G.T. Schjeldahl Co., Northfield, Minn., such mirrors were developed as an offshoot of the mirrors the same company developed and was used by the Space Program.

Mirror 6 is rotated by motor actuated mechanism 5, that the Schjeldahl Co. also offers to build at low cost, so that the sunlight from the sun 9 is reflected by paths 7 and 8 onto a grid work of refractory brick 13 during the time of day the sun is shining. The principle of the grid work is that radiant heat can be reflected into a tunnel and air passing through the tunnel can pick up the heat by convection from the tunnel walls before it has a chance to radiate more than a small fraction back out of the tunnel.

The mirror 6 with its positioning device 5 is mounted on pole 3. The positioning device is provided with electrical current through cable 4 and is controlled by control system 1.

While only one mirror is shown in the drawing, obviously many mirrors would be normally used in a Solar Energy collection and storage system.

The drawing shows the St. Clair Solar Energy System in one of its most common forms with the grid work of refractory brick 13 as top walls of a hollow cylindrical tower 34. Tower 34 is of conventional construction being an outer steel tube with blanket type insulation attached to the inside walls. The refractory brick chosen will preferably be quite resistant to rapid temperature changes and I prefer silicon carbide brick.

The heat from the sunlight reflected onto the lattice work of brick 13 causes the surface of the brick to get hot and by drawing air through the lattice work the air is heated and hot air passes down the center of the hollow tower 34. By using sufficient number of mirrors for the amount of air drawn in it is possible to easily heat air by this method to over 2,000°F.

On top of the lattice of brick work is mounted insulated top 38 on top of which is pole 16 on which is mounted electric light bulb 17 which is of the correct color to grow crops during periods the sun is not shining. Electricity controlled by switch 15 is supplied by electric power line 33. Reflector 31 reflects the light towards mirror 6. When the sun is not shining, insulated swinging door 14 is swung down and radiation of heat from the hot lattice work 13 back outside is prevented.

When the sun is shining and air is being heated the hot air passes down through the center of the tower 34 and passes through the pile of pebbles 37. This heats the pebbles. In this patent when I use the word "pebbles" I use it in the very broad sense commonly used in the pebble bed heat exchange field. It means any piece of rock, either synthetic or natural, of a size that will work. This means that the pebbles will not break down more than can be afforded for a particular application and the application can vary very widely as to requirements. In this particular use I prefer to use either high grade sandstone or what I call synthetic sandstone which is actually old fashioned sand-lime mortar broken into chunks. (In the enormous area in this country called the Corn Belt the ground is covered with 30 to 100 feet deep of a mixture of sand, clay and some pebbles. The 20 percent sand is easily settled out from the mud formed in dredging a hole in the level land and is purified by the very cheap process called flotation. This sand is mixed with several percent of lime and a little water and the mixture sets in a few days to sand-lime mortar. Since the hole dredged out can be used to store water the sand is almost obtained free on a large scale. In the bottom of a dredged out hole 50 feet deep is stored water cooled in the winter to 37°F and on the top is stored water to irrigate the crops. A sheet of plastic sheet floating on top keeps the winds from stirring the water.)

The above sandstone and lime-sand mortar have the very desirable property of having a very low amount of expansion between about 1300° Fahrenheit and about 3000°F, the latter being the melting point. (These temperatures vary somewhat according to the impurities present.) This low volume change with temperature makes this material able to have big pieces be heated or cooled rapidly without cracking the big pieces. And this property has been taken advantage of in the steel industry for hundreds of years as for example the use of silica brick for the roofs of open hearth furnaces that are subjected to very rapid cooling every time a cold charge of scrap iron is put in the furnace. An additional advantage of a low volume change on heating is that the pile of pebbles does not have its pieces grind against each other as the pieces expand and contract in a large pile.

As for the size of the pebbles usually the only requirement is pressure drop for the air flowing through, the bigger pebbles having much less pressure drop when air is forced through the pile. But in many parts of the pile only very low velocity air flows are needed and small pebbles can be used. The necessity for very large piles of pebbles is eliminated by making a large number of small piles and moving the system that uses the Solar Heat around by using the transportation system disclosed in my patent application Ser. No. 385,844 now abandoned.

The pile of pebbles 37 is insulated by insulating cover 36, which may be a layer of fiber insulation covered by a water impervious cover.

When the sun light is being reflected on the lattice work of brick 13, air drawn through the lattice work is heated and flows down the hollow tower 34, passes through the pebbles in the pile of pebbles 37 and flows down the hollow tower 34, passes through the pebbles in the pile of pebbles 37 and flows out of the pile 37 by pipe line 40 to fan 43 and passes through valved pipe line 35 back to under where hinged door 14 forms a canopy over the top of the tower and which canopy holds preferentially the once used hot air that is still perhaps 1400° Fahrenheit in temperature. (It is to be emphasized that hot air of this temperature is much lighter per cubic foot than atmospheric air and winds less than a windstorm will only slightly displace it from a canopy of as much as 5 foot depth. Normally during a wind storm the mirror 6 would be rotated horizontal to avoid the effect of wind on it.)

When the Solar Heat is used, the hot air is drawn from the bottom of tower 34 by pipe line 39 and passes through Solar Heat use 47, which may be any conventional use of heat such as the production of steam or the operation of a pebble bed heat exchanger to heat the compressed air cycled in a gas turbine, and then passes through pipe line 46, fan 48, valved pipe line 41 and pipe line 40 back into the bottom of pile of pebbles 37. Fan 48 provides the power to overcome the pressure drop in this use of hot air.

The above shows how the heat of the sun is about all collected at a high temperature and about all used at a high temperature which results in the efficient use of the heat obtainable in sunlight.

When the sun is not shining and particularly at night hinged insulated door 14 is closed down and artificial light 17 is turned on. The light produced is reflected by mirror 6 over growing corn plants 51 and their rate of growth is increased.

Obviously artificial light 17 can be mounted on any tall equipment around that has another use so that a separate tower for the artificial light 17 is not needed. It is to be noted artificial light 17 is not heavy.

In conclusion it is said that it has been found that with very little extra expense it is now possible to substantially increase the crop yields on fields where solar heat reflecting mirrors are used to collect Solar Energy.

A special case of this is the use of artificial light in the disclosed invention to speed up the growth and to greatly shorten the time required to grow vegetables. In this way vegetables raised locally can be marketed before the regular local crop is ready for market and in this way get a much higher price. Since artificial light will be reflected sideways a much more efficient use of light can be made with short crops spaced in rows far apart. Far apart rows allow more room for picking, etc., and by placing plastic film between the rows the rainfall can be concentrated to an area less than the rain falls on. And at the same time with rapid growth of the vegetables this allows a crop of a deep rooted crop to also be planted the same year to maintain or even increase soil tilth.

As a result of all of the above farmers will very gladly welcome Solar Energy instead of fighting it.

I claim:

1. A solar heat collecting energy conversion system comprising: at least one heat reflecting mirror and means for changing position of said mirror, means for absorbing and storing heat derived from solar energy reflected by said mirror whereby the position of the mirror can be adjusted to reflect the sun's rays when the sun is in different positions in the sky, energy conversion means connected to said storage means for generating electricity, a source of artificial light and means for connecting the energy conversion means to said source of artificial light whereby the light of the sun is reflected by the mirror onto the heat absorbing means when the sun is shining and when the sun is not shining the source of artificial light is reflected by the mirror on crops growing on the ground and thus increase the growth of the crops.

2. An apparatus according to claim 1 in which said means for connecting the energy conversion means to said source of artificial light comprises electricity carrying wires.

3. A method for using solar energy comprising: reflecting sun light from at least one mirror onto a solar energy absorbing means, passing air in contact with said absorbing means thereby heating the air, passing the heated air to a storage means whereby the heat energy is stored until needed, converting the heat energy to electricity, using the electricity to power a source of artificial light when the sun is not shining, directing the source of artificial light onto crops thereby increasing the rate of growth.

4. A method as in claim 3 wherein the source of artificial light is reflected off of said mirror onto the crops.

* * * * *